H. KIMMET.
AUTOMOBILE BRAKE.
APPLICATION FILED SEPT. 18, 1915.
1,200,120.
Patented Oct. 3, 1916.
2 SHEETS—SHEET 2.
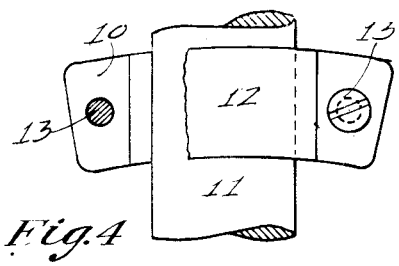
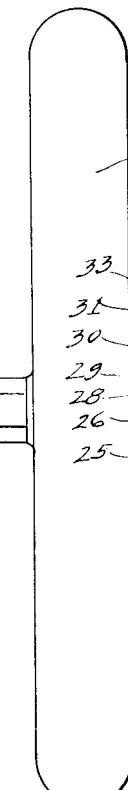
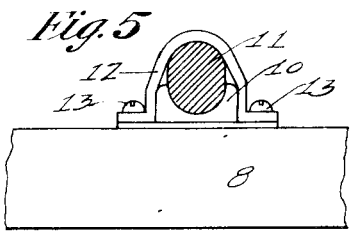
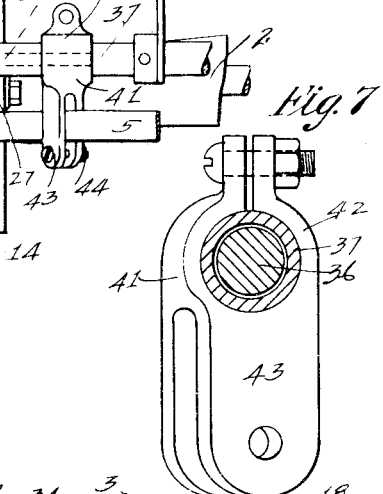
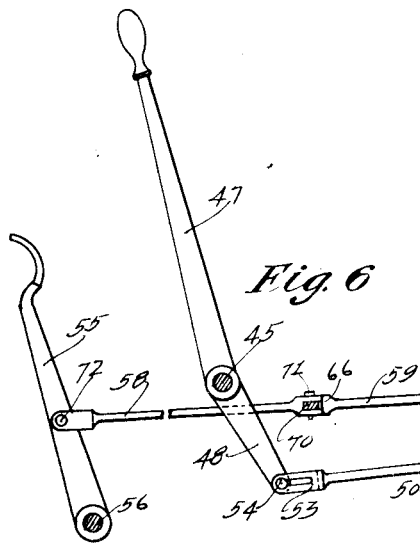
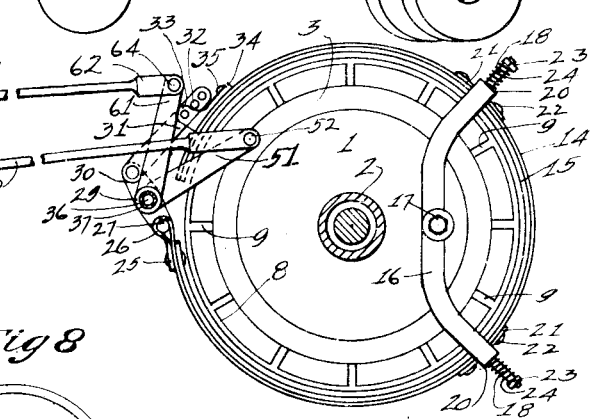
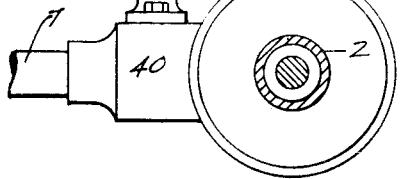
Witnesses,
J. D. Haskin
Geo. E. Marlatt
Inventor,
Henry Kimmet
By
Arthur L. Mack
Attorney.

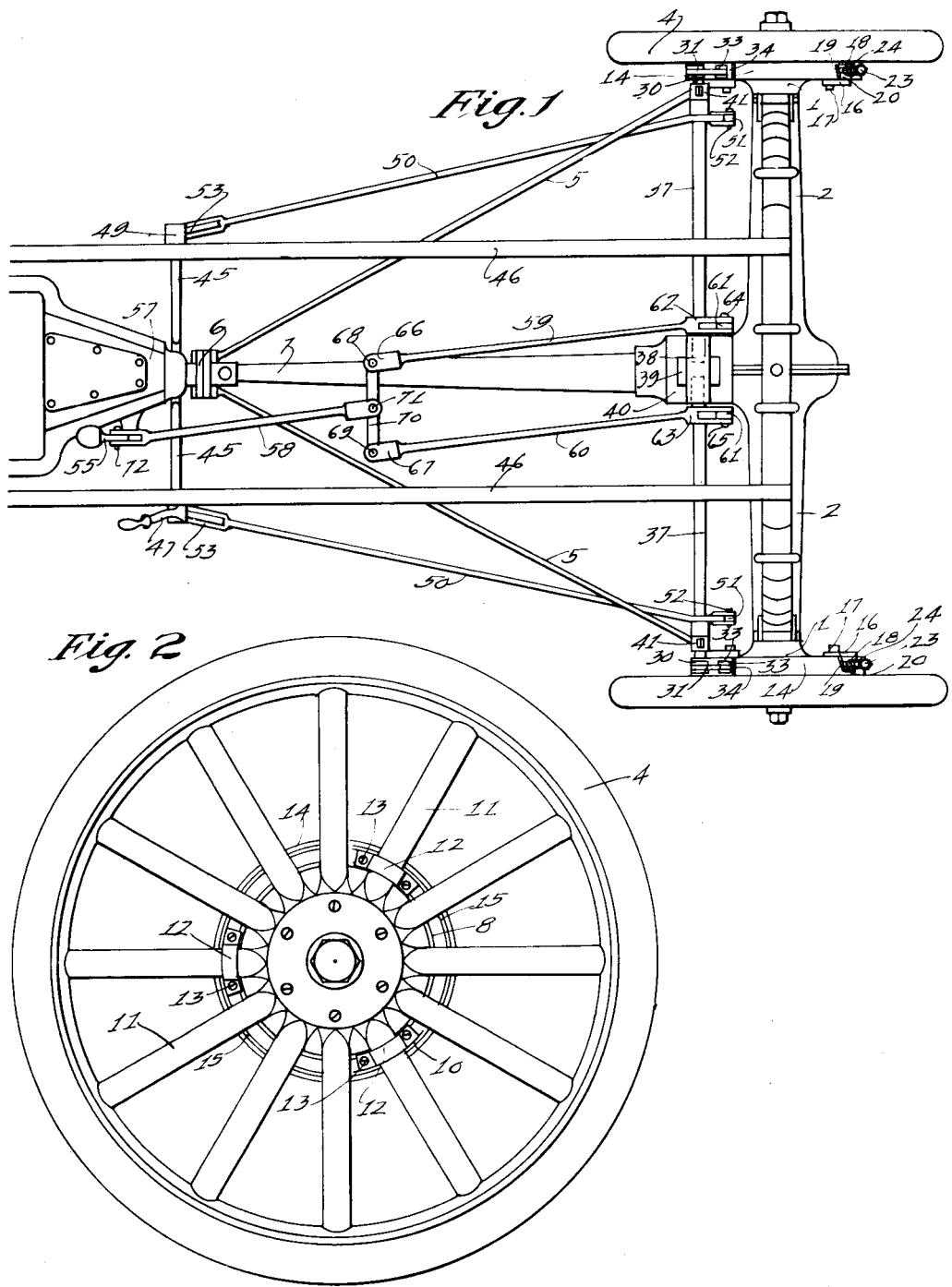

UNITED STATES PATENT OFFICE.

HENRY KIMMET, OF LOS ANGELES, CALIFORNIA.

AUTOMOBILE-BRAKE.

1,200,120.  Specification of Letters Patent.  Patented Oct. 3, 1916.

Application filed September 18, 1915.  Serial No. 52,313.

*To all whom it may concern:*

Be it known that I, HENRY KIMMET, a citizen of the United States, residing at Los Angeles, in the county of Los Angeles and State of California, have invented a new and useful Improvement in Automobile-Brakes, of which the following is a specification.

My invention relates to brakes for automobiles and while it may be used successfully with certain types of such vehicles, it is particularly adapted to one of the most generally used types of vehicles and the application of my improved brakes is shown in connection with this particular type of vehicle in the annexed drawings.

An object of my invention is to provide a brake which may be attached to the usual brakes of this type of vehicle without any material change in the running gear and which may be used in connection with and in addition to the usual brakes.

The brakes usually provided on the rear wheels of the vehicle have not sufficient surface to constitute a thoroughly efficient and practical brake for steep grades, and an object of my invention is, therefore, to provide a brake of substantially enlarged dimensions which will afford ample braking facilities for the steepest grades, and which may be connected with both the emergency and foot operated levers of the vehicles.

A further object is to provide a connection between the brakes and the emergency and foot levers which will render the brakes independently operable by either of said levers, and the arrangement being such that the operation of the brakes by means of the foot lever will not change the normal relation of the hand operated emergency lever.

Other objects may appear in the description.

Referring to the drawings, in which similar characters of reference indicate the same parts throughout the several views, Figure 1 is a plan of the rear portion of the vehicle running gear showing the application of my improved brakes thereto; Fig. 2 is an exterior elevation of one of the rear wheels showing the manner of attaching my brakes to the wheels; Fig. 3 is a typical elevation of the brake assembly at right angles to Fig. 2; Fig. 4 is an enlarged view of the brake mounting; Fig. 5 is a plan of Fig. 4; Fig. 6 is an elevation of the brake assembly showing the lever connections; Fig. 7 is an enlarged view of the brake rod supports; Fig. 8 is an elevation of the central brake rod bearing attached to the differential housing.

Internal brakes 1 which are secured to the axle housing 2 at each end are generally used on this type of vehicle and outer brake members 3 of relatively small diameter and face dimensions are secured in a suitable manner to the wheels 4, and the brakes are supported on opposite sides of the vehicle by means of radius rods 5 which are secured to the brake housing at the rear ends and to a collar 6 on the transmission shaft housing 7 at their front ends.

I provide supplemental brake members consisting of circular bands 8 of substantially larger diameter than the usual members 3 and a plurality of radial lugs 9 formed on the band 8 which serve to space the band 8 from the member 3 and hold it in concentric relation therewith when it is slipped on over this member into operative position. A plurality of lugs 10 are formed on the outside of the bands 8 which have concave outer surfaces adapted to conform to the periphery of the wheel spokes 11 and to fit tightly thereagainst. Straps or stirrups 12 which also conform to the shape of the spokes fit over the outside of the spokes and are secured to the lugs 10 by means of screws 13 for firmly holding the brake member 8 on and in rotatable relation with the wheels 4.

Metallic brake bands 14 of the ordinary type and form which are provided with an inner frictional band 15 of leather or fabric, are normally loosely positioned over the inner brake member 8 and the ends of these latter bands more closely approach each other than in the usual brake bands of this character for the purpose of obtaining the maximum braking surface. The metal bands 14 are suitably riveted to the inner frictional bands 15 and are resiliently held on the original brake housings 1 by means of brace members 16 which are centrally secured to the housings 1 by means of cap screws 17. The outer ends 18 of the braces 16 are bent at right angles over the outer metallic bands 14 and are provided with slots 19 to receive the pins 20 which are secured rigidly in the bands 14 and are reinforced by short metal plates 21 secured to the bands 14 by means of rivets 22. The outer ends of the pins 20 carry nuts 23 and springs 24 are interposed and adapted to compress between the ends 18 of the braces 16 and the nuts 23 in order that the movement of the outer bands 14 in the braking operation may be compensated for by the compression of the springs, and the pins 20, in such event moving in the slots 19 to correspond. The springs 24 on the pins 20 serve to release the bands 14, when the operating levers are released, from frictional engagement with the brake drums 8.

The lower ends 25 of the outer bands 14 are bent around to form a bearing 26 for a hinge pin 27 to each of which one end 28 of a lever 29 is pivoted. The other ends 30 of the levers 29 are pivoted to the lower ends of links 31 and the upper ends of the links are pivoted in one of the several perforations 32 between and to the lugs 33 of brackets 34 which are secured by means of rivets 35 to the upper ends of the outer brake bands 14. Thus the two ends of the brake bands 14 are connected by means of the levers 29 and the links 31, and adjustably so, in order to provide for the taking up of the slack in the brake due to the wear from constant operation. Short rods 36 are secured in the central portions of the levers 29 and extend inwardly toward the center of the vehicle for receiving the outer ends of the hollow shafts 37 which are secured firmly to the rods 36 by any suitable means. The inner ends of the brake shafts 37 are journaled in the central bearing 38 on the bracket 39 secured to the hub 40 of the differential housing, shown in Fig. 8. The shafts 37 are supported rigidly at the outer ends by means of depending supports 41 which are loosely held on the shafts at the hubs 42 and have the bifurcated lower arms 43 which are adapted to straddle and clamp over the radius rods 5 by means of the clamping bolts 44.

A transverse shaft 45 is suitably journaled on the running gear frame 46 and one end of this shaft carries the hand emergency lever 47 with the depending arm 48, while the other end of the shaft carries an arm 49. The usual brake rods 50 on each side of the frame are connected pivotally with the lower ends of the arms 48 and 49 on the shaft 45 and at the other ends these rods are connected with the original internal brakes of the vehicle.

I provide levers 51 which are firmly secured to the shafts 37 adjacent to the supports 41, and in order to properly connect my supplemental mechanism with the operating levers, I first disconnect the rear ends of the brake rods 50 from the original brakes 1 and connect them by means of hinge pins 52 with the levers 51 on the shafts 37. To carry out the objects of my invention it is necessary to disconnect the forward ends of the rods 50 from the arms 48 and 49 and to provide the ends of the rods with elongated clevises 53. These clevises have both vertical and horizontal slots to receive the lower ends of the arms 48 and 49 and the pins 54, respectively, in order that the movement of the brake rods may be effected by means of the foot lever 55 without effecting the movement of the hand lever.

The foot lever 55 which is usually pivoted on a shaft 56 in the rear end of the transmission housing 57, is connected with the brake shafts 37 by means of the brake rod 58. The parallel rods 59 and 60 are connected with the pair of levers 61 on the shafts 37 in a manner similar to the connection of the rods 50 with the levers 51 associated with the hand lever 47. The clevis ends 62 and 63 of the rods 59 and 60 are pivotally connected to the levers 61 on the pins 64 and 65; the clevis ends 66 and 67 of the rods 59 and 60 are similarly connected by pins 68 and 69 to opposite ends of a lever 70 which is centrally pivoted on a pin 71 to the rear end of the rod 58; and the forward end of the rod 58 is pivotally connected to the foot lever 55 by means of a pin 72 at a point above the fulcrum of the lever. This arrangement permits the compensation for any inequality of movement of the two rods 59 and 60 and the levers 51.

The foot lever 55 is connected with and operates an internal brake in the transmission housing while the hand lever on this type of machine is always used for operating the rear brakes 1 on the rear axle and wheels.

With my improvements just described, the foot lever may be used as usual for operating the transmission brake, but in addition to this is used to operate the supplemental brakes, and when so operated, the sliding joint between the rods 50 and the arms 48 and 49 permits the hand lever to remain stationary and ineffective, thus assuring the maximum braking efficiency of the vehicle for emergencies. The same brakes may also be operated by the hand lever, however, as the pivot pins in the clevises on the rods 50 are normally at the forward end of the slots in which they travel when the hand brake lever is stationary, and when the brakes are operated by this hand lever, the foot brake will also be moved forward.

The improved arrangement and the interconnections between the two sets of operating means insures a maximum braking efficiency when it is necessary, and still the brakes may be operated independently, if it is desired.

Having thus described my invention, what I claim as new and desire Letters Patent for, is:—

1. In an automobile brake means, the combination with the usual running gear frame and rear wheels, of brake drums attached to said wheels, brake bands concentrically supported with respect to and arranged for frictional engagement with said drums, transversely alined rock shafts connected with and arranged for effecting the engagement of said bands with said drums, hand and foot operating means therefor, means for separately and independently connecting said hand and foot operating means with said rock shafts for selectively operating said brakes thereby, means whereby the operation of said brakes by the foot operating means may not effect the operation of the hand operating means, and means attached to said drums for disengaging said bands therefrom when said operating means is released.

2. In an automobile brake means, the combination with the usual running gear frame and rear wheels, of brake drums carried by said wheels, brake bands arranged for frictional engagement therewith, transversely alined rock shafts supported on said frame in parallel relation with the axis of said wheels, means for adjustably connecting said brakes and said rock shafts, for regulating the traction of the brakes, hand and foot operating means for the brakes, means for independently connecting said hand and foot operating means with said rock shafts for selectively operating said brakes by either of said means, and means for restoring said bands to their normally disengaged relation with said drums when the operating means is released.

3. An attachment for automobile brakes capable of being supported on the vehicle frame and adapted to be connected with the usual transmission brake means of such vehicles including brake drums on the wheels, friction brake bands supported on said frame and capable of adjustment for regulating the traction on said drums, independently operable hand and foot operating means for said brakes connected with and adapted to simultaneously operate said transmission brake therewith.

4. In a vehicle brake mechanism including the running gear frame, rear wheels and transmission brake, the combination of friction brake drums carried by said wheels and supported concentrically thereon, friction bands supported on said frame and arranged for frictional engagement with said drums, means for regulating the traction of said bands on said drums, rock shafts connected with said bands and supported on the frame, means for connecting said rock shafts with said transmission brake, means for simultaneously operating said friction and transmission brakes, and means for resiliently connecting said drums with said bands for releasing the bands subsequent to the restoration of the operating means to normal position.

5. In a vehicle brake mechanism including a running gear frame with wheels supported thereon and a transmission brake, and hand and foot controlled operating means for the brakes, the combination of a pair of friction brake drums supported on said wheels, brake bands yieldably supported on said frame for engagement with said drums, rock shafts adjustably connected with said brake bands and supported on said frame, means for connecting said friction and transmission brakes for operation, means for equalizing the operation of said friction brakes, means for effecting the independent operation of said friction brakes relative to said transmission brake, and resilient brake band restoring means supported on said drums.

6. In a vehicle brake mechanism including friction and transmission brake means and hand and foot controlled brake operating means, the combination of brake drums supported on the wheels, brake bands supported in concentric relation therewith, means for adjusting the traction of said bands on said drums, rock shafts connected with and for operating said brake bands and supported on said frame, means for operably connecting said hand operating means with said rock shafts for operating said friction brakes, means for connecting said foot operating means with the rock shafts for operating said transmission and friction brakes, said connection being arranged to permit the independent operation of the friction brakes without affecting the transmission brake, and means attached to said drums for releasing the friction brakes upon the restoration of the operating means to normal position.

Signed at Los Angeles, in the county of Los Angeles and State of California, this 16th day of August, 1915.

HENRY KIMMET.

Witnesses:
J. D. HASKIN,
CHARLES H. WILD.

Copies of this patent may be obtained for five cents each, by addressing the "Commissioner of Patents, Washington, D. C."